US006647813B2

United States Patent
Green

(10) Patent No.: US 6,647,813 B2
(45) Date of Patent: Nov. 18, 2003

(54) FLEXIBLE ROD TRANSMISSION

(76) Inventor: Robert R. Green, 1222 W. Grand Ave., Chicago, IL (US) 60622

( * ) Notice: Subject to any disclaimer, the term of this patent is extended or adjusted under 35 U.S.C. 154(b) by 82 days.

(21) Appl. No.: 09/938,037

(22) Filed: Aug. 23, 2001

(65) Prior Publication Data

US 2003/0037627 A1 Feb. 27, 2003

(51) Int. Cl.[7] .............................................. F16H 21/54
(52) U.S. Cl. .............................................. 74/45; 74/25
(58) Field of Search ........................ 74/25, 47, 82, 74/44, 45, 48, 49, 50

(56) References Cited

U.S. PATENT DOCUMENTS

| | | | | | |
|---|---|---|---|---|---|
| 1,715,735 A | * | 6/1929 | Banning, Jr. | ................. | 417/473 |
| 1,901,981 A | * | 3/1933 | Ousback | ..................... | 173/115 |
| 3,400,595 A | * | 9/1968 | Pfeiffer | ..................... | 74/47 |
| 3,983,769 A | * | 10/1976 | McConnell et al. | ......... | 82/1.11 |
| 3,998,435 A | * | 12/1976 | de Bruyne | ................. | 366/243 |
| 4,105,368 A | * | 8/1978 | Waters | ......................... | 417/53 |
| 4,137,783 A | * | 2/1979 | Oosterling et al. | ............ | 74/47 |
| 4,266,434 A | * | 5/1981 | Burns | ............................ | 74/61 |
| 4,309,152 A | * | 1/1982 | Hagen | ....................... | 417/218 |
| 4,395,890 A | * | 8/1983 | Goodlaxson | ................ | 68/23.7 |
| 4,397,197 A | * | 8/1983 | Jenney | ......................... | 476/26 |
| 4,400,875 A | * | 8/1983 | Buzzi et al. | ................ | 30/43.92 |
| 4,418,586 A | * | 12/1983 | Maki et al. | ................... | 74/831 |
| 4,801,249 A | * | 1/1989 | Kakizawa | .................... | 417/269 |
| 4,924,718 A | * | 5/1990 | Glover | ........................... | 74/25 |
| 5,482,448 A | * | 1/1996 | Atwater et al. | ............. | 417/492 |
| 5,700,135 A | * | 12/1997 | Inokuchi et al. | ............ | 417/269 |
| 5,823,749 A | * | 10/1998 | Green | .................... | 416/132 B |
| 5,873,411 A | * | 2/1999 | Prentiss | ...................... | 166/105 |
| 6,062,153 A | * | 5/2000 | Nanthavong | ........... | 112/470.33 |

* cited by examiner

Primary Examiner—David A. Bucci
Assistant Examiner—Julie K. Smith

(57) ABSTRACT

A drive mechanism for converting rotary movement to an oscillatory movement for operating switches, valves, pumps and light implements wherein the oscillating member is a flexible rod having a curved profile from which to attach output levers positioned in a simple manner to vary the amplitude, phase timing, and duration of stroke of individual output levers; whereby numerous output functions may be performed from a single rotary input source.

8 Claims, 4 Drawing Sheets

FLEXIBLE ROD TRANSMISSION

BACKGROUND OF THE INVENTION

This invention relates to devices for converting rotary movement into oscillating movement, specifically to such devices that require selectively adjustable output.

Vertical axis windmills of the type disclosed in U.S. Pat. No. 5,823,749 to Green (1998) for aeration of ponds require a transmission that can convert vertical axis rotary movement into reciprocating movement to operate multiple air pumps. It is desirable for these pumps to be arranged conveniently and economically, and provide means for seasonally adjusting the stroke of the pumps to accommodate changes in wind conditions. In low wind conditions, a shorter stroke will create less resistance and allow easier starting. It is further desirable that in other circumstances where rotary motion is to be converted to reciprocating movement, that the output be easily adjusted to selectively choose the amplitude, phase timing and duration of individual output levers.

U.S. Pat. No. 1,715,735 to Banning (1929) discloses a multiple pump design activated by an oscillating rod. However, this pump entails expensive manufacturing methods and complicated lubrication requirements, and the amplitude of stroke of Bannings pump is not adjustable. In addition, the oscillating, rigid rod disclosed has a single angle over its length. Therefore, attached output levers will oscillate with the same angle even though they are attached at different positions along the rod.

U.S. patent to Oosterling (1976) discloses an adjustable stroke conversion device that has an output adjustment mechanism. In this device, an adjustment may be made to the amplitude of a single output and does not anticipate the need for a means to selectively adjust individual magnitude, timing and duration of multiple reciprocating outputs from the same rotary source.

BRIEF SUMMARY OF THE INVENTION

The present invention is a device for converting rotary movement into reciprocating movement. A flexible rod is employed to oscillate levers for the operation of a variety of implements. These implements may include electrical switches, valves, pumps, animated advertising displays, animated garden ornaments, toys, and robots. Some of these applications may require activation of multiple elements at different intervals of timing, different amplitude, and different duration of movement from a single rotating input source. It is object of the invention to provide a simple means to achieve complex reciprocal output with minimal structure.

It is further object of the invention to provide a novel structure that has versatility of use. That use may include but not limited to the operation of the mechanical and electrical apparatus before mentioned; and that the conversion device of the present invention may be powered by various power sources.

It is further object of this invention to provide versatility of output with compactness and economy of structure. The structure of the present invention is intended to provide convenient arrangement for implementation, whereby, input and output are disposed linearly, and the manufacturing requirements are uncomplicated and economical.

Other objects and advantages of this invention will become apparent in the detailed description of the rotary to oscillating conversion mechanism as follows.

DETAILED DESCRIPTION OF THE INVENTION

Figure 1:
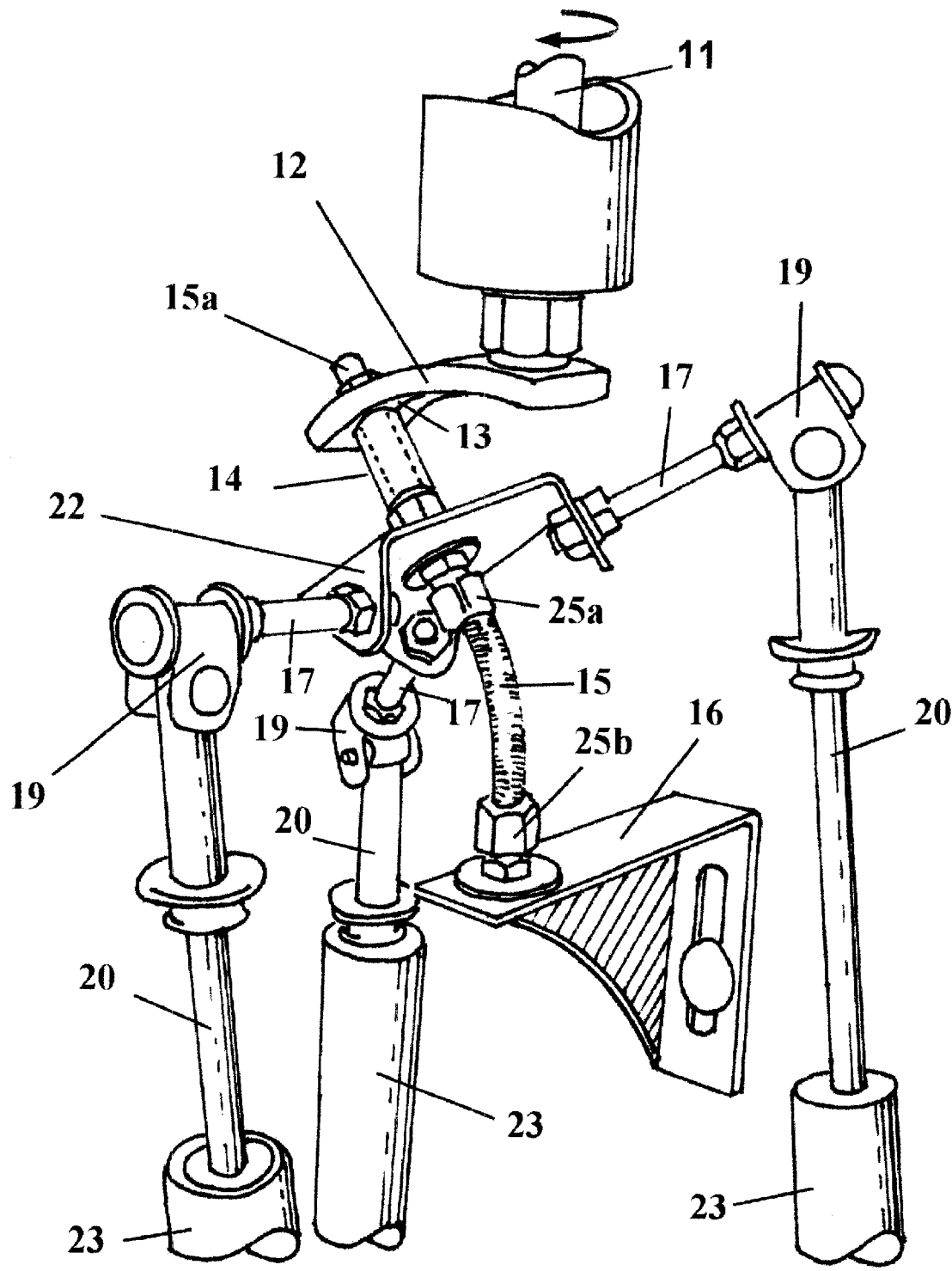
FIG. 1 is a perspective view of a pump mechanism constructed in accordance with the invention

Referring to the drawings in general, the invention embodied therein comprises a reciprocating mechanism including a driving rotary means 11 upon which is mounted a slotted crank arm generally designated 12. In accordance with the invention, crank arm 12 is provided with a curved profile and a slot 13 through the center of crank member 12 along its length. Captured in slot 13 of crank member 12 is a journal 14. Journal 14 is provided with an adjustment means 14a to selectively change its position closer, or farther from driving means 11 whereby the eccentricity of an oscillating member journalled in crank arm 12 may be adjusted. An oscillating member is provided and consists of a flexible rod 15, having concentric layers of helically wound, hardened wires of the type that has properties that resist twisting, but is adaptable to being easily flexed.

The wire structure of flexible rod 15 oscillating member is typically used in flexible drive shafts. In the embodiment of the preferred structure, the oscillating member is fixedly secured at a distance from, but in the same axis as rotary means 11. Stationary bracket 16 is provided for the support and attachment of flexible rod 15. Flexible rod 15 oscillates by means of the eccentric rotary movement of crank arm 12 but is prevented from twisting by its concentrically wound wire structure and compression fitting 25b, through which flexible rod 15 is securely fastened. Journal 14 allows frictionless movement of crank arm 12 while oscillating flexible rod 15. Levers 17 refer to the first power takeoff structure.

Referring to the drawings in particular, FIG. 1 shows an air pump mechanism wherein three piston type air pumps perform pumping action with a predetermined phase difference. Crank arm 12 revolves with rotary shaft 11. Output rod 15a consists of a solid rod fixed rigidly to lever bracket 22. Output rod 15a is freely oscillated through journal 14. Levers 17 extend outward from lever bracket 22 to create pumping action through universal joints 19 and piston shafts 20. Flexible rod 15 is clearly shown in this preferred embodiment. Pump cylinders 23 are shown in partial view.

Numerals 25a and 25b show compression fittings that secure flexible rod 15 rigidly to lever bracket 22 and stationary bracket 16. Stationary bracket 16 provides attachment of flexible rod 15 to a stationary structure.

Figure 2:
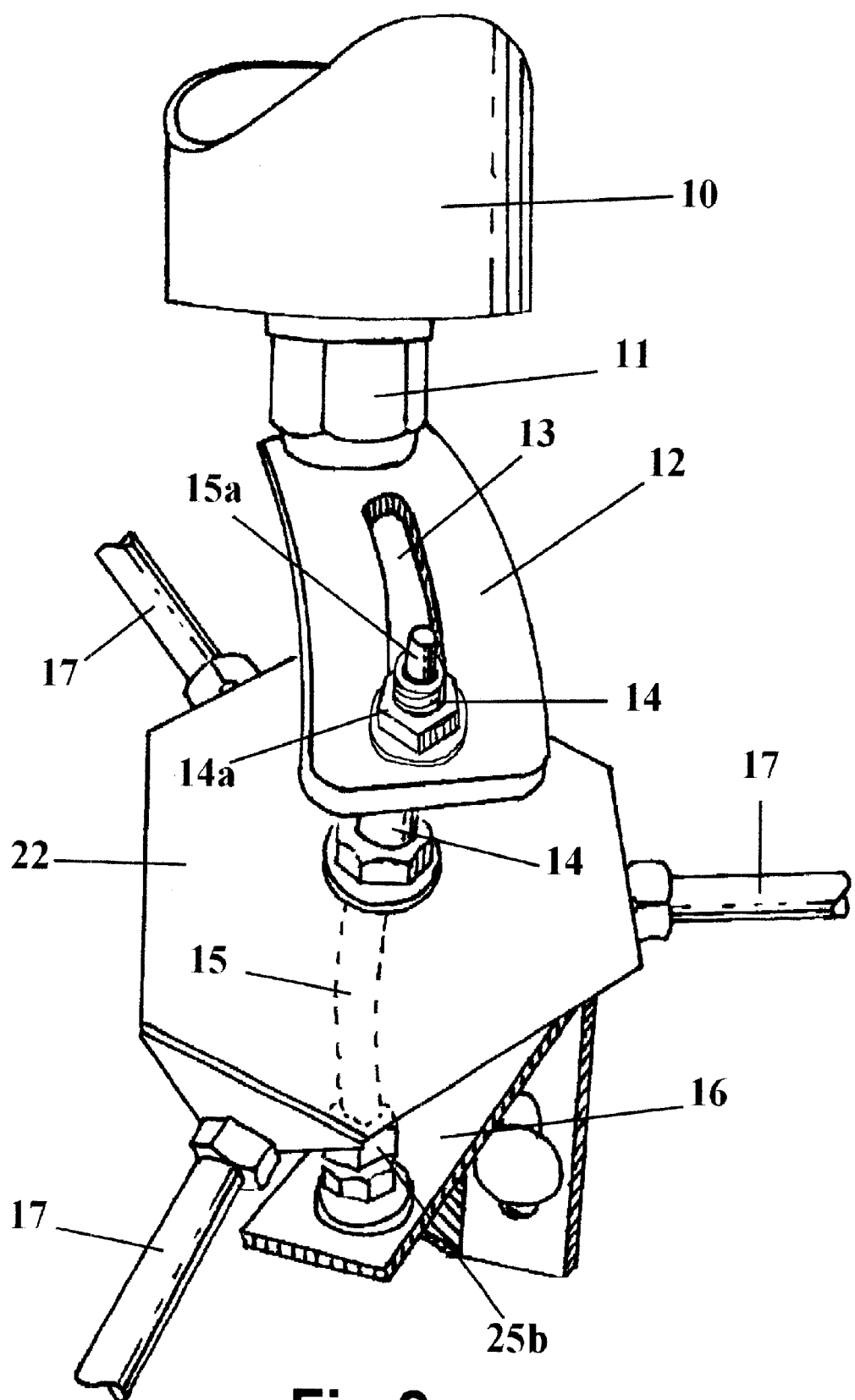
FIG. 2 is a perspective view of the invention showing the adjustment detail of the flexible rod transmission

FIG. 2 shows a detail view of the pump arrangement shown in FIG. 1, wherein rotary driving shaft 11 revolves through bearing mount 10 to rotate slotted crank arm 12. Journal 14 is clearly shown captured in slot 13 wherein it may be adjusted to change magnitude of oscillation of levers 17. Numeral 14a shows a positioning nut to secure journal 14 at selective positions within slot 13. Solid output rod 15a can be seen protruding through journal 14. Flexible rod 15 can be seen through lever bracket 22 fastened to stationary bracket 16 with compression fitting 25b.

Figure 3:
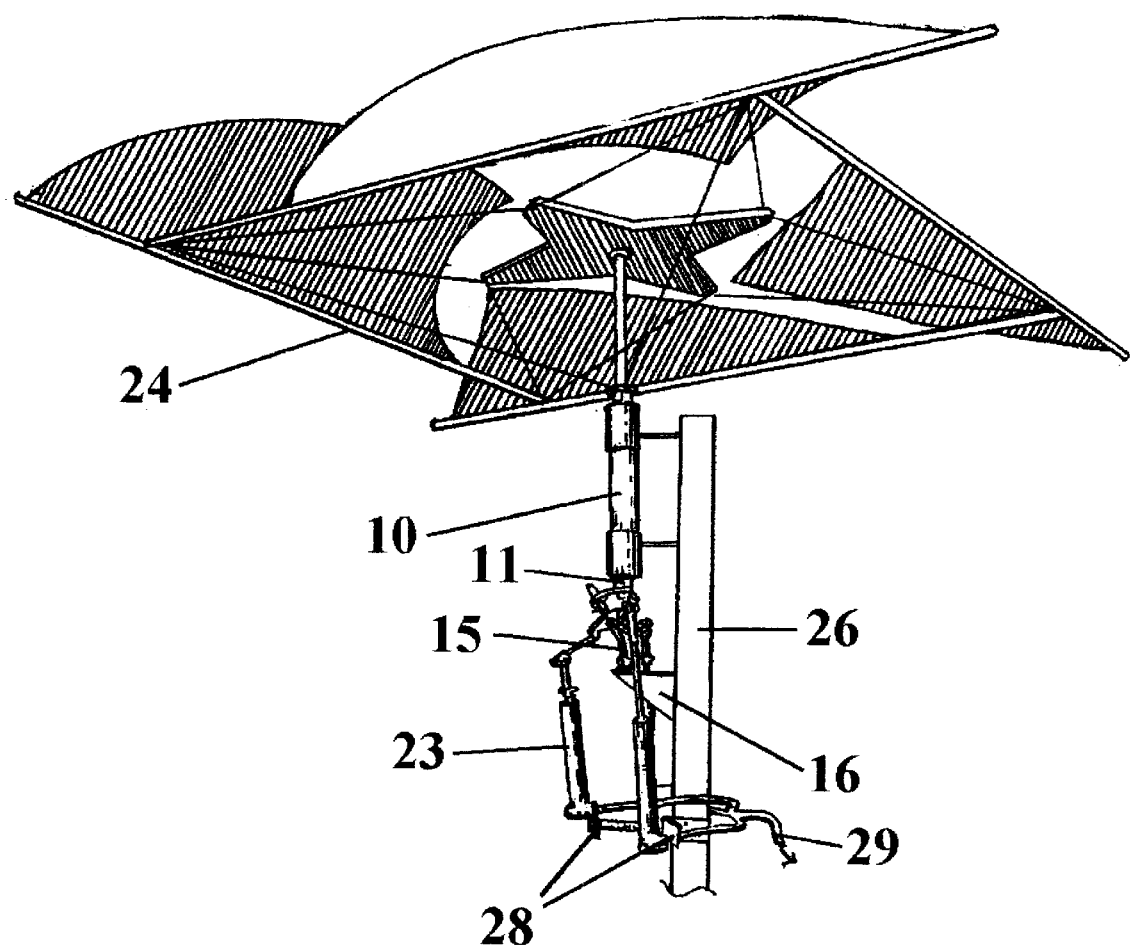
FIG. 3 is a perspective view of the invention applied to windmill air pumps

FIG. 3 is a full view of the windmill operated air pump system showing its convenient arrangement. Pumps 23 are powered by windmill 24 through bearing mount 10 and rotary shaft 11 to oscillate flexible rod 15. Stationary bracket 16 is secured to windmill tower structure 26. Pump cylinders 23 are flexibly secured to tower structure 26 by pump bracket 28. Air is discharged through collective hoses 29.

Figure 4:
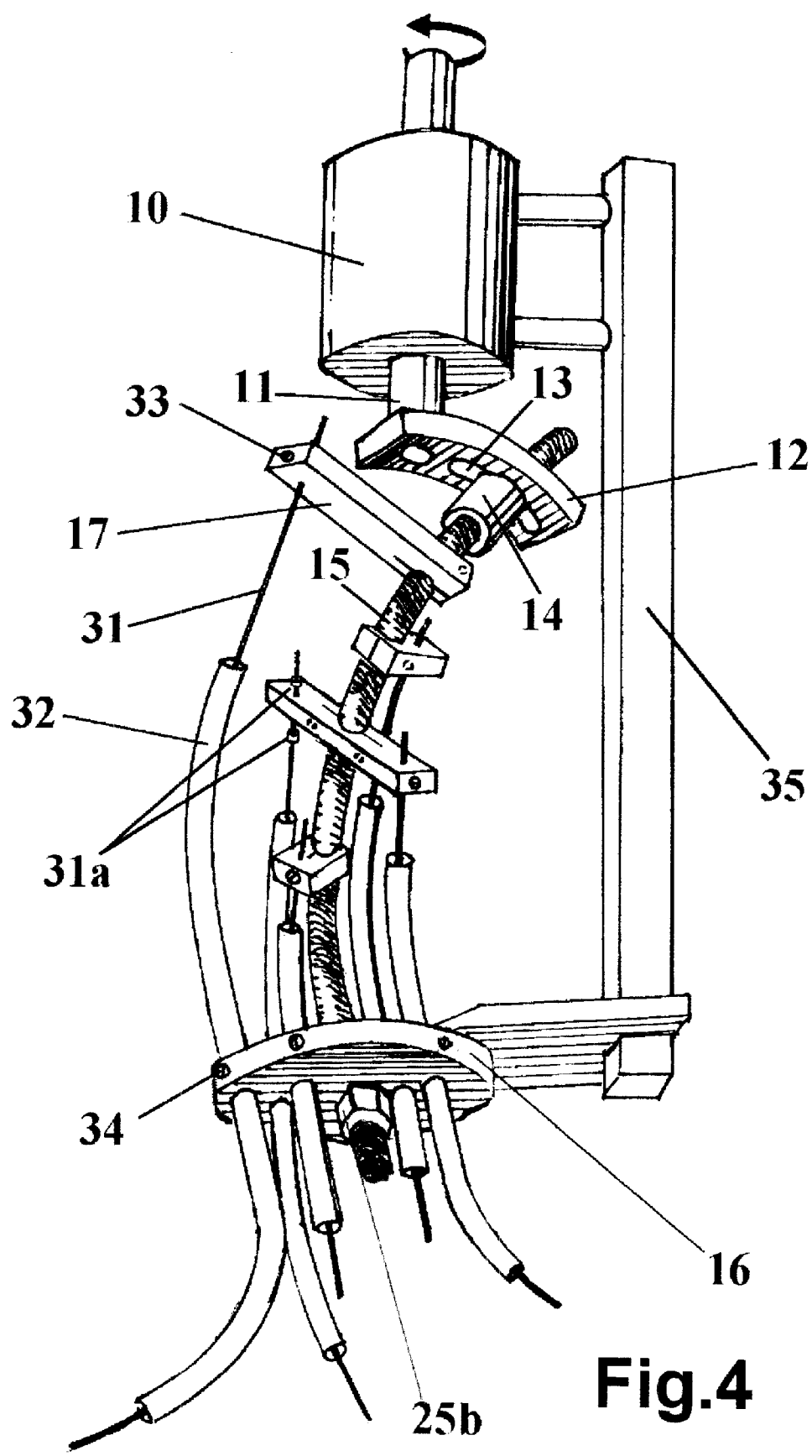
FIG. 4 is a perspective view of the invention designed to operate a plurality of adjustable valves, switches, or light mechanical apparatus

FIG. 4 shows a variant of the adjustable rod transmission wherein input is rotary but may be selected from any appropriate source including non-rotary manipulation. Output may be selective in amplitude, timing, duration and direction.

In accordance with the invention, bearing mount 10 through which input shaft 11 rotates slotted crank arm 12 and adjustable journal 14 to oscillate flexible rod 15. Flexible rod 15 is shown extending through journal 14 and terminating in compression fitting 25b, which is secured fixedly to stationary bracket 16. Numeral 17 shows takeoff levers of various lengths and positions selectively secured along flexible rod 15. Wire cables 31 are shown attached to levers 17 with set screws 33. Cable stops 31a are provided to allow slippage of wire cable 31 for determining duration of stroke. Wire cables 31 are guided through cable guides 32 to operate valves, switches or light mechanical apparatus. Cable guides 32 are held stationary by the provision of set screws 34 in stationary bracket 16.

An advantage of the invention is that the output levers may be easily placed in various positions along and around flexible rod 15 to achieve different or synchronous oscillatory periods and amplitude.

Unlike prior oscillating devices, the flexible rod oscillating member of the present invention has a curved profile. This novel feature provides a selection of locations from which to place output levers that provide different degrees of oscillation. Therefore, a single rotary input may be employed to operate a plurality of output levers with selective output properties.

Another advantage of the invention is that in addition to selecting amplitude of oscillation of individual output levers, total amplitude of all output levers may be selectively adjusted by moving journal 14 in slotted crank arm 12. Although the preferred embodiment shows an adjustably journalled crank member, a fixed journal may be employed without departing from the principles of the present invention.

An improvement of the present invention is that the number of parts required for basic operation of the conversion device is reduced and the remaining elements are simple and have few lubrication requirements. Because of these improvements, the cost of operation and manufacture is substantially reduced.

While a specific embodiment of the invention has been shown and described in detail to illustrate the principles, it will be understood that the invention may be embodied otherwise without departing from such principles.

What is claimed is:

1. A device for converting rotary movement into reciprocating movement employed to operate light implements including pumps, valves and switches comprising
   (a) a rotatable driving means;
   (b) a crank arm rigidly secured to said rotatable driving means;
   (c) a flexible rod made of helically wound wires secured fixedly at a distance from said crank arm in substantially same axis as said rotatable driving means; said flexible rod journalled eccentrically in said crank arm and,
   (d) at least one lever attached perpendicular to said flexible rod whereby rotary movement in said rotatable driving means produces reciprocating motion in said at least one lever.

2. The conversion device of claim 1 wherein said crank arm is provided to flex in an eccentric manner said flexible rod.

3. The conversion device of claim 2 wherein a journal is provided in said crank arm to prevent simultaneous rotation of said flexible rod and said crank arm.

4. The conversion device of claim 3 wherein said flexible rod is journalled in said crank arm through said journal which is adapted to adjust in a displaceable manner the eccentricity of said flexible rod.

5. The conversion device of claim 4 wherein said crank arm including a slot through the center wherein said journal is adapted to move adjustably.

6. The conversion device of claim 1 further including means to securely fix in a rigid manner one end of said flexible rod at a distance from and substantially in the same axis as said driving means.

7. The conversion device of claim 1 further including means to selectively position said at least one lever to, around and along said flexible rod to provide variable reciprocating output with selectively different phase timing, amplitude and duration.

8. A device for converting reciprocating movement into rotary movement comprising:
   (a) a rotatable driven means;
   (b) a crank arm rigidly secured to said rotatable driven means;
   (c) a flexible rod made of helically wound wires eccentrically journalled in said crank arm and securely fixed at a distance from said crank arm in substantially the same axis as said rotatable driven means, and
   (d) at least one elongate lever secured perpendicular to said flexible rod wherein reciprocating movement of said elongate lever produces rotary movement in said rotatable driven means.

* * * * *